J. G. JONES.
MOTOR CYCLE DRIVE.
APPLICATION FILED NOV. 15, 1912.
1,105,351.
Patented July 28, 1914.
3 SHEETS—SHEET 1.
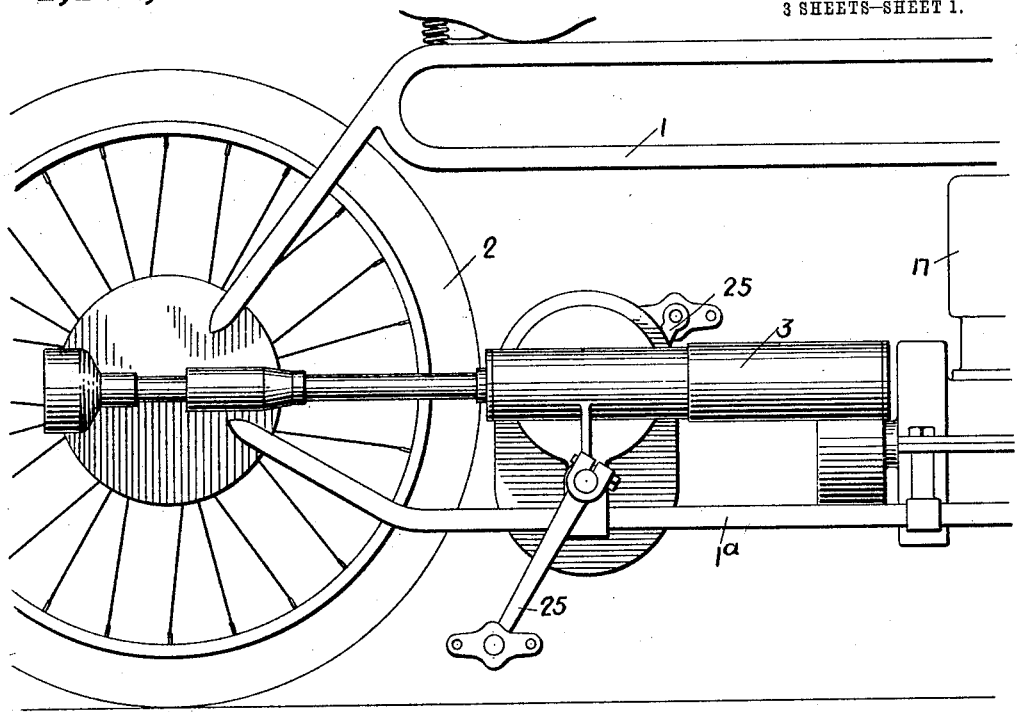
FIG. I.
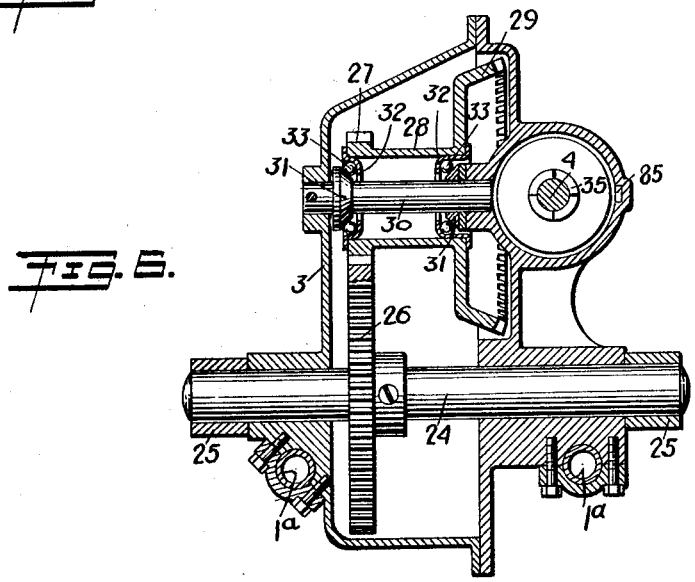
FIG. 6.
WITNESSES
G. Robert Thomas
INVENTOR
Joseph G. Jones,
BY
ATTORNEYS

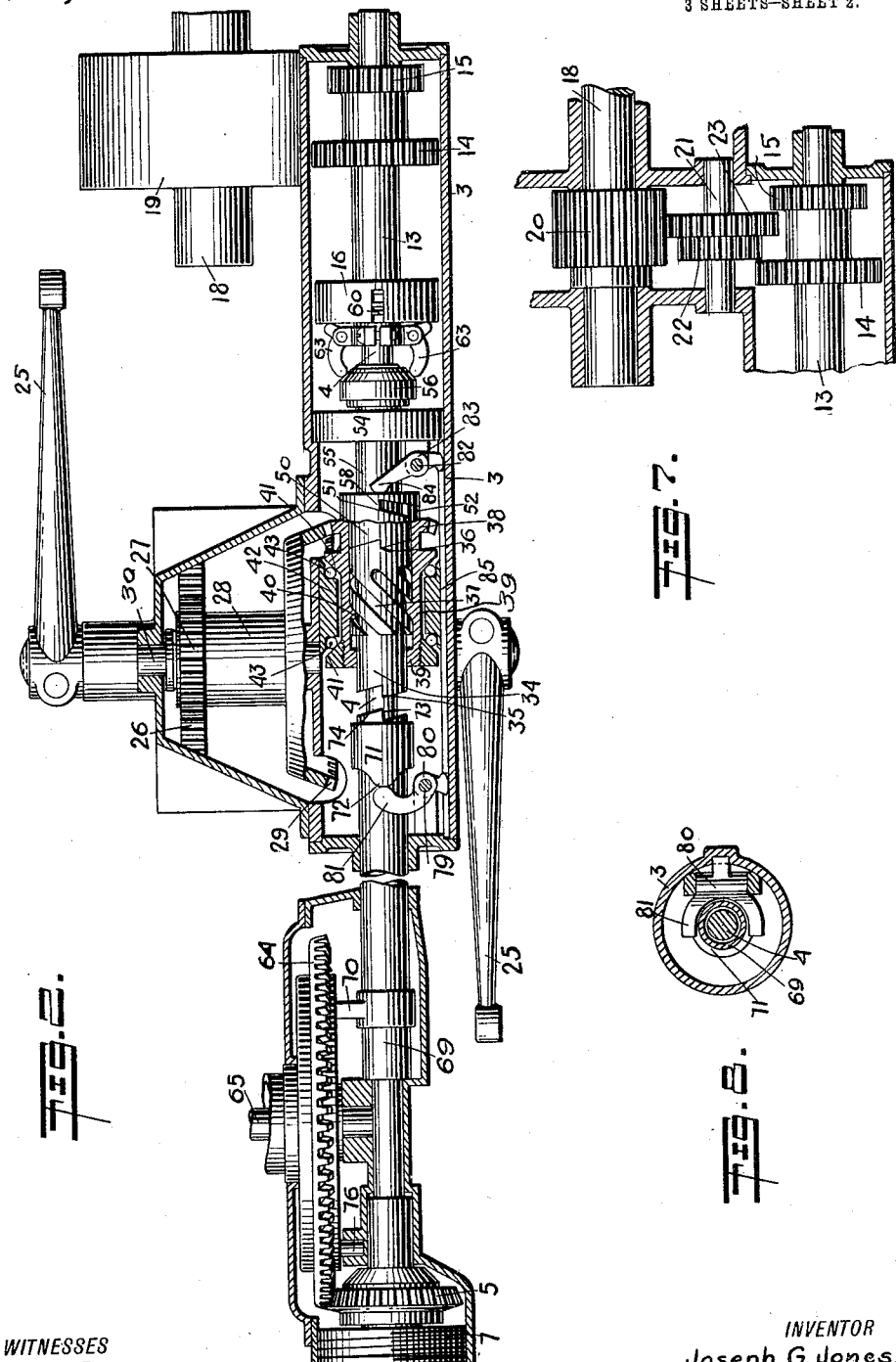

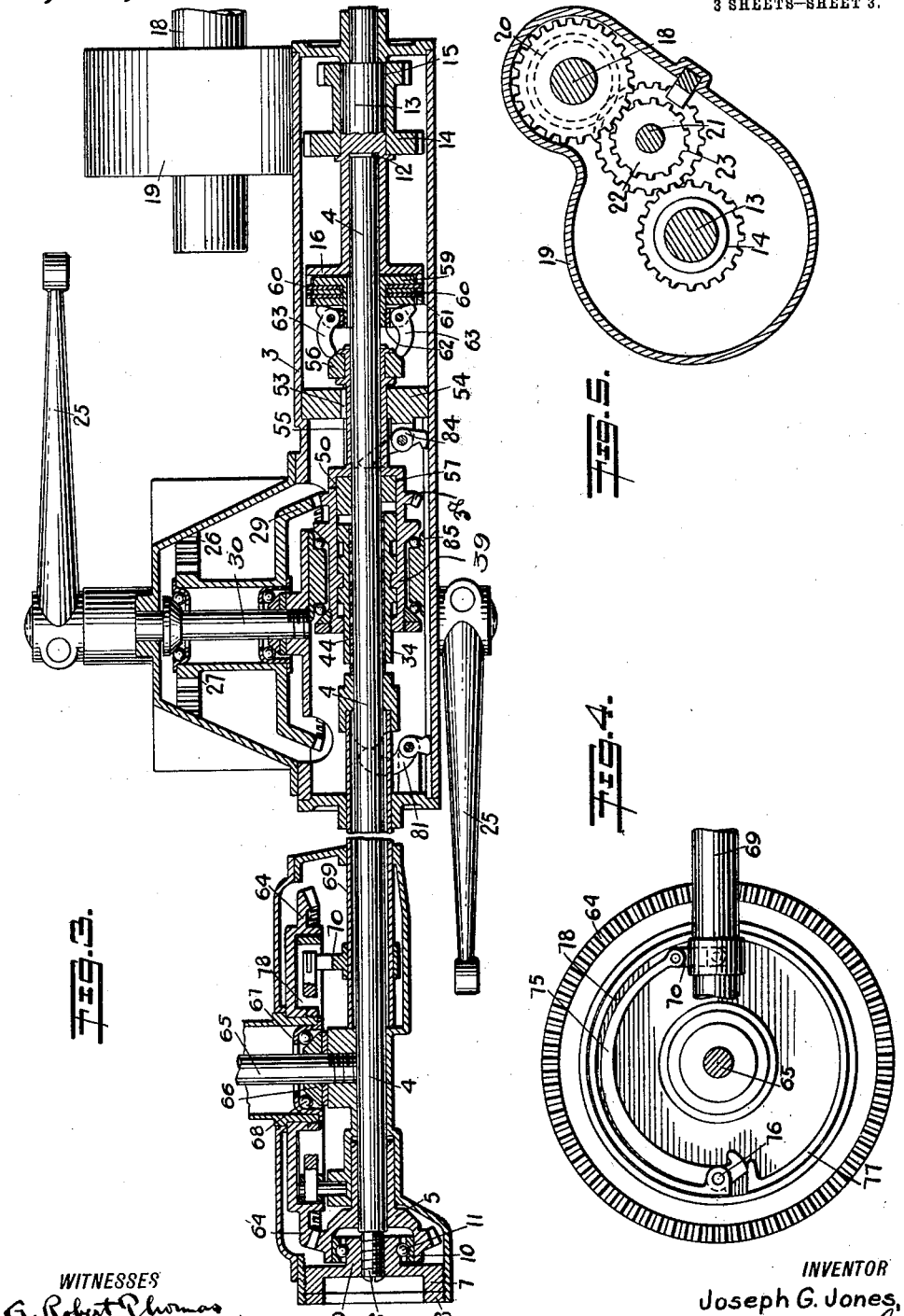

UNITED STATES PATENT OFFICE.

JOSEPH G. JONES, OF PONTIAC, MICHIGAN.

MOTOR-CYCLE DRIVE.

1,105,351.  Specification of Letters Patent.  Patented July 28, 1914.

Application filed November 15, 1912. Serial No. 731,459.

*To all whom it may concern:*

Be it known that I, JOSEPH G. JONES, a citizen of the United States, and a resident of Pontiac, in the county of Oakland and State of Michigan, have invented a new and Improved Motor-Cycle Drive, of which the following is a full, clear, and exact description.

This invention relates to a motorcycle drive, and the particular purpose of the invention is the provision of a new and improved drive whereby the forward motion of the pedals turns the shaft and sets the motor clutch, a backward movement of the pedals releasing the clutch and applying the brake, the pedals being released from the operating and driving means after the forward movement of the pedals is stopped, the motor clutch being left in operative position.

The invention aims to provide a new and improved drive for motorcycles characterized by simplicity of operation and fewness of parts, the design being such that the drive shaft is substantially parallel with the centers of the wheels.

Other objects and advantages not specifically set forth follow from the use of the mechanism herein described and claimed, or from the use of sub-combinations of such mechanism, such objects and advantages appearing as the description of the structure proceeds.

Reference is to be had to the accompanying drawings forming a part of this specification, in which like characters of reference indicate corresponding parts in all the views, and in which—

Figure 1 is a partial side view of a motorcycle equipped with the improved driving mechanism; Fig. 2 is a longitudinal sectional view of the drive; Fig. 3 is a similar view; Fig. 4 is a partial vertical sectional view showing the working mechanism; Fig. 5 is a vertical sectional view showing the transmission; Fig. 6 is a vertical sectional view at right angles to Figs. 2 and 3, setting forth the relation of parts between the pedal shaft and the main drive shaft; Fig. 7 is a horizontal sectional view of the casing showing the transmission, also set forth in Fig. 5; while Fig. 8 is a vertical sectional view showing the mechanism for operating the sleeve which actuates the brake.

The motorcycle may be of any desirable size, and is preferably made up of a frame 1, the design of which may vary widely, provided with the usual wheels 2. The power plant and the driving mechanism may be mounted in any suitable manner on the frame, but preferably are carried on the lower longitudinally extending members 1ª. The mechanism to be specifically described is mounted in a casing 3, the size and shape of which may vary; extending longitudinally of the casing is the main drive shaft 4 carrying the gear 5 at its rear end, which end engages the adjustable supporting screw 6 carried by the closure member 7 held in position by the ring 8, the closure member being adjustable within the casing in order to take up the end play of the shaft, and the ring maintaining the member in such position. The closure member 7 is shouldered on its inner end as at 9, and the peripheral portion thereof, together with a ring 10 concentrically arranged therewith, form raceways for a number of balls 11, the said gear 5 being bored at its side to receive the said ring. The other end of the said shaft 4 is received in the bore 12 of the shaft 13, which carries a plurality of gears 14—15, and also a slotted drum 16 which forms one-half of a friction clutch to be more specifically described later. The motor 17 is preferably connected to the motor shaft 18 which extends within the housing 19 carrying a gear 20, which gear is adapted to supply power to the said shaft 13 in varying ratios of speed through the medium of a countershaft 21 having a plurality of gears 22—23 thereon; this transmission mechanism is, of course, merely typical of one form which may be used on the motorcycle, any convenient and desirable device being equally well adapted for the purpose; the intermediate gears 22—23 may be brought into engagement with either of the gears 14—15 on the shaft 13 in any convenient manner, preferably from a point convenient to the rider.

Extending transversely of the frame 1, and mounted in suitable bearings carried thereby, is the shaft 24 having the pedals 25 fixed to its ends, this shaft carrying a gear 26 contained within the casing 3, which gear meshes with a smaller gear 27 carried at one end of a wheel 28 having a bevel gear 29 adjacent its other end. This wheel 28 is substantially as shown in Fig. 6, being supported on a pin 30 carried by the casing, the pin carrying cones 31, between which and the cups 32 a number of balls 33 are positioned, whereby a substantially frictionless and easy running structure is provided.

Surrounding the drive shaft 4 is a cylindrical clutch 34, having the teeth 35—36 at its ends, the outside thereof being provided with a number of grooves 37; arranged concentrically with the shaft 4 and this cylindrical clutch 34 is a driven gear 38 having a sleeve 39 with a cam 40 on its inner surface which is adapted to engage in one of the above-mentioned grooves 37, this driven gear and sleeve being provided with tapered portions 41 between which and the fixed portion 42 carried by the casing are a number of balls 43, whereby ease of operation is insured. This driven gear 38 meshes with the gear 29 (Fig. 6) which is driven directly from the pedal shaft; referring particularly to Fig. 3 it will be noted that between the cylindrical clutch 34 and the drive shaft 4 is a helical spring 44, one end of which engages the said cylinder, and preferably in a keyway therein, this spring serving the purpose of a drag.

Keyed to the main drive shaft 4 is a clutch 50, the said clutch being housed between the above-mentioned driven gear 38 and the shaft 4, one end of the clutch being formed with teeth adapted to co-act with the teeth 36 adjacent one end of the said cylindrical clutch 34, as shown particularly in Fig. 2, it being noted from this same figure that the forward end of the driven gear 38 is inclined as at 51 and is provided with teeth 52. Surrounding the drive shaft 4, and prevented from turning by reason of the keyed engagement 53 with the fixed member 54 within the casing 3, is a slidable sleeve 55 having a plurality of spaced shoulders adjacent its forward end, between which is a roller 56, the other end of this sleeve being enlarged and counter-bored in order to receive a portion of the fixed clutch 50, and also provided with an inclined end 57, and having teeth 58 which are adapted to co-act with the teeth 52 at the forward end of the said driven gear 38.

The before-mentioned slotted drum 16 (Fig. 3) serves the purpose of one-half of a friction clutch, coöperating with the sleeved element 59 keyed on the drive shaft 4, there being a number of plates 60 concentric with this sleeved element, a part of which have portions engaging in the slots 61 of the said drum, the remaining parts, alternating with the first, having portions engaging in slots in the element 59; the element 59 carries a ring 62 having levers 63 pivotally mounted therein, the forward ends of the levers being adapted to be engaged by the tapered portion of the roller 56, the rear ends of these levers being then adapted to bring the plates and the said element into more or less intimate contact, whereby turning movement is transmitted from the said shaft 13 to the drive shaft 4.

The rear wheel of the motorcycle carries a gear 64 which meshes with the gear 5 secured to the drive shaft 4, the wheel itself being movable about the pin 65, which pin carries a conical bearing 66, between which and the cup 67 are a number of balls 68, whereby easy relative movement of the parts is provided.

Surrounding the drive shaft 4 is the brake tube 69, having an arm 70 extending from one side thereof, the forward end of this tube having a clutch element 71 fixed thereon, the rear side of which is provided with projections 72, the front side being provided with teeth 73 having inclined portions 74 between them. The particular structure of the brake mechanism is shown in Fig. 4 and comprises the lever 75, one end of which is pivoted to the said arm 70, the other end of which is mounted on a pin 76, the short arm of this brake lever being adapted to engage one end portion of the brake element 77 which is contained within the pocket 78 in the said gear 64, the brake being of the ordinary expansion variety.

Pivotally mounted at 79 within the casing 3 is a lever 80, the longer arm 81 of which is adapted to engage the said projections on one side of the clutch element 71; also pivotally mounted within the said casing at 82 is a second lever 83, the longer arm 84 of which is adapted to engage the plane side of the enlarged end of the sliding sleeve 55; slidably mounted in position between the two levers 80 and 83 is the bar 85, adapted to transmit motion from one of these levers to the other by reason of the engagement of the shorter arms of each with the ends thereof. Referring particularly to Fig. 8 it will be noted that these levers are bifurcated, whereby the arms thereof may substantially embrace the said shaft 4 and tube 69 and engage the said projections 72 fixed on this tube.

The manner of use or operation of the parts described may be set forth as follows: When power is applied to the pedals 25 the pedal shaft 24 and the gear 26 carried thereby are turned, the turning movement being transmitted to the gear 29 which meshes with the driven gear 38 (Fig. 2); during this time the shafts 4 and 13, and also the engine (it will be assumed) are not turning; after the driven gear 38 begins to turn the cam 40 on the interior thereof will turn the movable clutch element 34; as the turning continues the teeth 36 at the forward end of this clutch element come into engagement with the coöperating teeth on the other clutch element 50 which is keyed to the shaft 4, this shaft then turning, the turning of the driven gear 38 causing the forward inclined end thereof to move the rear enlarged end of the slidable sleeve 55, whereby the roller 56 at the forward end thereof comes into engagement with the levers 63, whereby a turning movement is imparted to the driving shaft 13 through the medium of the friction clutch so that the engine is turned over, and other conditions being satisfied, the engine starts to work under its own power, after which stoppage of the movement of the pedals leaves the engine and the power shaft 13 and also the shaft 4 turning over. The drag of the said spring 44 which surrounds the drive shaft 4 will bring the clutch element 34 out of engagement with the coöperating clutch element 50 keyed on the drive shaft, and a back pedaling movement will bring the teeth 35 on the rear end of this clutch element 34 into engagement with the teeth 73 on the forward end of the clutch element 71 which is fixed on the brake tube 69, so that the tube will be turned and the arm 70 thereon will operate the brake lever 75 in order to bring the brake element 77 into engagement with the side wall of the pocket 78, whereby the machine is stopped. The relation of the levers 80 and 83 to each other through the medium of the sliding bar 85 is such that when the brakes are applied, as by the turning of the brake tube 69, the projections 72 coming into engagement with the longer arm 81 of the lever 80 will cause it to move about center, sliding the bar 85, and bringing the longer arm 84 of the lever 83 into engagement with the plane side portion of the enlarged end of the slidable sleeve 55, whereby the roller 56 at the forward end of this sleeve is brought away from the levers 63, thereby rendering the clutch inoperative and permitting the engine and shaft 13 to continue running with the motorcycle remaining still.

Having thus described my invention, what I claim as new and desire to secure by Letters Patent is:—

1. In a structure such as described, the combination of a power shaft, a source of power, a clutch between the said source and the shaft, means for operating the clutch, a member movable lengthwise of the shaft, a device for engagement with the said means in order to bring the clutch to operative position, an element fixed to the shaft, the said member being adapted to engage the said element, and other means for turning the said member.

2. A structure such as described, comprising a power shaft, a source of power, a clutch between the source and the shaft, a grooved element slidable lengthwise of the shaft, means for actuating the clutch, a device carried by the shaft adapted to be engaged by the said element, other means engaging the said grooved element for operating the clutch actuating means, and a mechanism for imparting movement to the means which engages the said grooved element.

3. In a structure such as described, the combination of a shaft, a two-part clutch, one part being provided with teeth and turning with the shaft, the other being provided with coöperating teeth and also provided with a groove, and being movable lengthwise of the shaft, a clutch between the shaft and the source of power, and means for moving the grooved part of the clutch in order to bring about coöperation of the said elements, thereby turning over the source of power through a preliminary movement of the said shaft.

4. In a structure such as described, the combination of a power shaft, a member extending longitudinally thereof adapted to actuate braking mechanism, the said member having teeth formed at one end, and a second member formed with coöperating teeth and adapted to be moved lengthwise of the shaft, whereby the said member is turned and the braking mechanism is actuated.

5. In a structure such as described, the combination of a power shaft, brake actuating mechanism extending longitudinally thereof, a clutch element constituting part of the said mechanism, a clutch element fixed to the said shaft and spaced from the brake actuating mechanism, a member movable longitudinally of the shaft and positioned between the said clutch elements, the said member being provided with teeth for engagement with either of the said elements, and a revoluble device for engagement with the said member in order to bring it into coöperative relation with either of the said clutch elements.

6. In a structure such as described, the combination of a shaft, brake actuating mechanism extending longitudinally thereof, one end of the said mechanism forming a clutch element, a second clutch element fixed to the said shaft, a grooved member movable longitudinally of the shaft and positioned between the said clutch elements and adapted to engage either of them, a revoluble device provided with an element adapted to engage in the groove of the said member, whereby it may be moved along the shaft.

7. In a motorcycle, the combination of a power shaft, a motor clutch for imparting power to the shaft, a brake actuating mechanism, the motorcycle being provided with a pedal shaft, and means between the pedal shaft and the power shaft and coöperatively engaged, whereby turning the pedals in one direction operates the motor clutch, movement of the pedals in the opposite direction operating the brake actuating mechanism.

8. In a structure such as described, the combination of a power shaft, a motor clutch for imparting power thereto, means movable lengthwise of the shaft for operating the clutch, brake actuating mechanism, a clutch element fixed to the shaft, a movable clutch element situable lengthwise of the shaft and adapted to turn the power shaft when moved in one direction and the brake actuating means when moved in the other direction, together with a plurality of arms coöperatively related for throwing out the motor clutch when the brake actuating means is operated.

9. In a structure such as described, the combination of a power shaft having an element fixed thereto, one end of the element being formed with teeth whereby it serves the purposes of a clutch member, a motor clutch for imparting turning to the shaft, means for actuating the motor clutch, a device comprising a revoluble member having an inclined face adapted to coöperate with the clutch operating means, a grooved element movable lengthwise of the shaft, and formed with teeth for engagement with the said toothed end of the element fixed to the shaft, and means for moving the grooved element, the said means constituting a part of the clutch actuating means, whereby the element fixed to the shaft and the shaft may be turned, the before mentioned inclined face coming into engagement with the clutch operating means whereby the motor is turned.

10. In a motorcycle, a power shaft, a motor clutch for imparting power to the shaft, means for actuating the clutch, an element fixed to the shaft and provided with teeth, a second coöperating element movable along the shaft and provided with a groove, a revoluble member having an inclined face and a part adapted to engage in the said groove whereby the said grooved element comes into engagement with the said toothed member fixed to the shaft, the inclined face coöperating with the said means for operating the clutch, thereby providing for the turning of the motor shaft after a preliminary movement of the power shaft.

11. A motorcycle comprising a power shaft in coöperative relation with one of the wheels thereof, a source of power, a motor clutch, brake actuating mechanism, the motorcycle being provided with a pedal shaft, means movable lengthwise of the shaft for actuating the motor clutch when the pedals are turned in one direction, whereby the preliminary turning of the shaft may be imparted to the motor, the clutch remaining in engagement when the turning of the pedals is stopped, turning the pedals in the opposite direction operating the brake actuating mechanism, and devices coöperating therewith for releasing the said motor clutch.

12. A motorcycle, comprising a main drive shaft, a motor, a shaft geared with the motor shaft, a clutch connecting said shaft with the drive shaft, a brake mechanism, a member mounted to move longitudinally on the drive shaft, a pedal shaft, means for operating the said movable member from the pedal shaft, means whereby when the member is moved in one direction the member will be locked to the shaft and the said clutch operated, and means whereby when the member is moved in the other direction the brake mechanism will be operated.

13. A motorcycle, comprising, a main drive shaft, a motor, a shaft geared with the motor shaft, a clutch connecting said shaft with the drive shaft, a brake mechanism, a member mounted to move longitudinally on the drive shaft, a sleeve surrounding the said member and operatively connected therewith a pedal shaft, gearing between the pedal shaft and the sleeve, means whereby when the member is moved in one direction the clutch will be operated, and means whereby when said member is moved in the other direction the brake mechanism will be operated.

In testimony whereof I have signed my name to this specification in the presence of two subscribing witnesses.

JOS. G. JONES.

Witnesses:
E. L. PARENT,
M. E. ELLIOTT.

Copies of this patent may be obtained for five cents each, by addressing the "Commissioner of Patents, Washington, D. C."